June 9, 1959  J. A. ZALONIS  2,889,656
TRIGGER ACTUATED FISH HOOK
Filed March 22, 1957
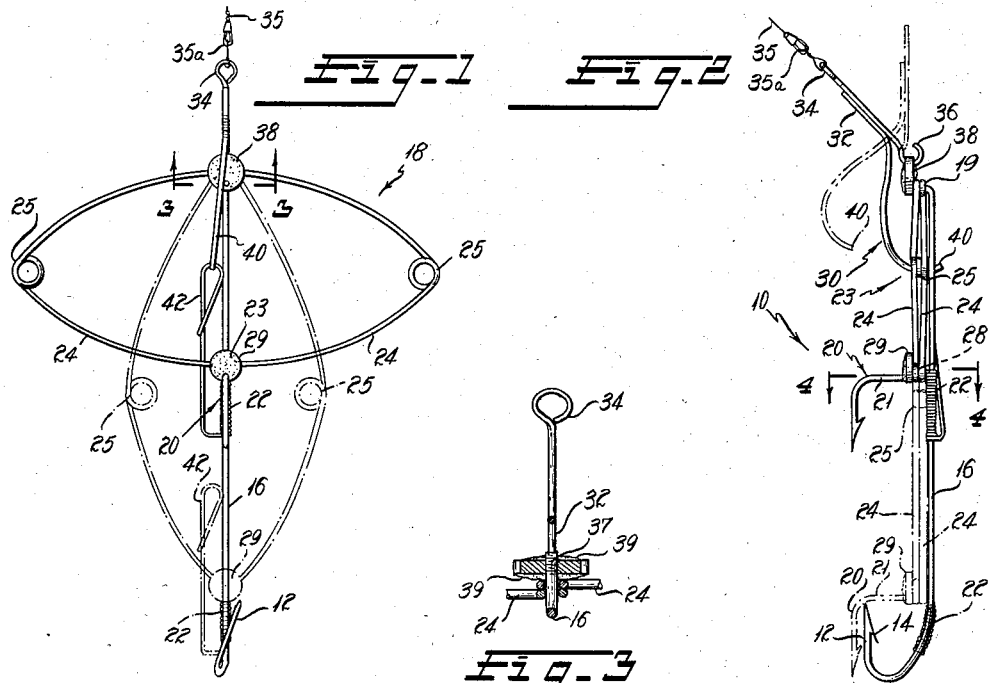
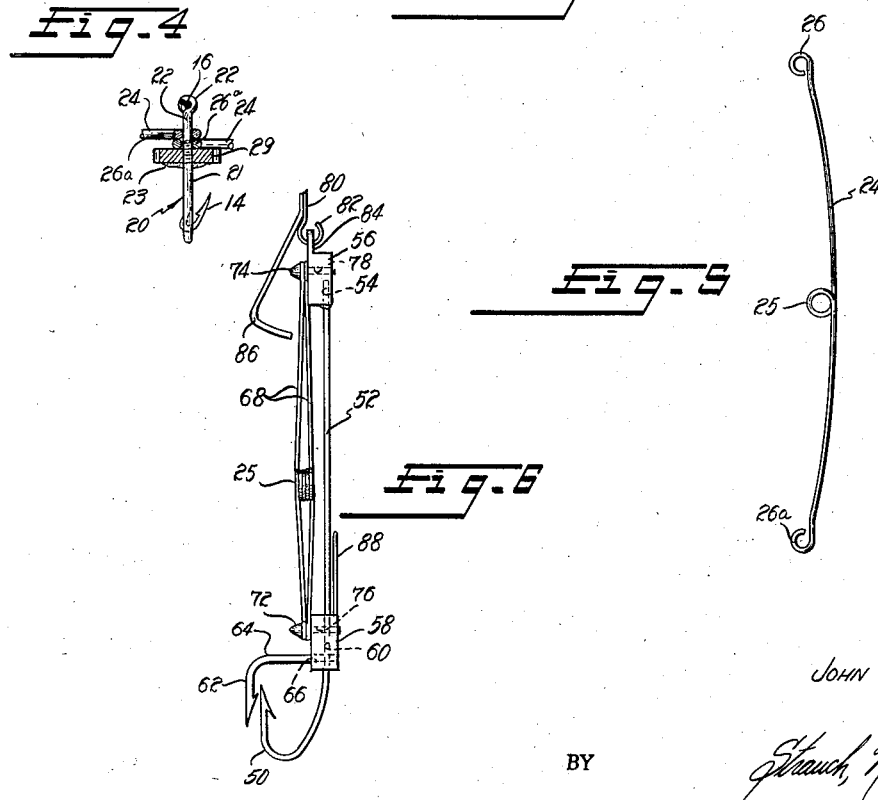
INVENTOR
JOHN ANTHONY ZALONIS
BY
ATTORNEYS

United States Patent Office 2,889,656
Patented June 9, 1959

2,889,656

TRIGGER ACTUATED FISH HOOK

John Anthony Zalonis, Laurel, Md.

Application March 22, 1957, Serial No. 647,776

4 Claims. (Cl. 43—37)

The present invention relates to improvements in fish hooks, and more particularly to improvements in trigger actuated fish hooks adapted upon trigger actuation to impale a fish upon a barb.

As is well known to fishermen, the setting of a conventional fish hook in a fish, especially one nibbling at the bait rather than striking the bait, requires a sharp jerk on the line. Oftentimes this attempt to set the hook pulls the baited hook out of a striking fish's mouth or away from a nibbling fish with the result that the fish is not only momentarily lost but is frightened away. In order to avoid such misses and lessen the frequency of loss of bait to a nibbling fish, various efforts have been made to provide a fish hook which automatically actuates an impaling barb to impale the fish in response to nibbling of a fish upon the baited hook or fish lure. Some prior art devices have relied solely on the pulling force upon the hook to actuate supplemental barbs while others have employed spring actuation and trigger control. None of these prior art devices, however, have proved particularly successful because of the manner of mounting the impaling barbs necessitating a slowness in actuation and the great distances through which the impaling barbs have to move to engage the fish. Examples of various forms of prior art structures may be found in United States Letters Patent No. 1,239,487 issued September 11, 1917, to A. L. Hill for Fishing Hook; No. 2,517,458 issued August 1, 1950, to C. A. Amspaugh for Fish Lure; and No. 2,608,786 issued September 2, 1952, to P. J. Schwartz for Fishhook Construction With Pull Actuated Release Means.

The present invention contemplates the provision of a fishing hook assembly embodying a bait support, preferably in the form of a straight shank barbed fish hook, and a keeper preferably in the form of an impaling barbed spear, mounted in opposed relatively movable relation to the barbed end of the hook and resiliently biased together and adapted to be maintained in separated relation by a trigger mechanism swivellingly mounted on the bait support and attached to a conventional leader and releasable by any pull effective to move the hook relative to the leader line.

The principal object of the present invention is to provide a fishing hook assembly of such improved construction that it is practically impossible for a fish to nibble the bait from the hook without being caught.

More specifically, the principal objects of the present invention are to provide a fishing hook assembly embodying:

(1) A trigger controlled resiliently biased spear-like barb adapted to be automatically released to impale a fish in response to nibbling at the baited hook of such an assembly;

(2) A bait support, such as a straight shanked hook, and a trigger actuated resiliently biased keeper, such as an impaling spear, mounted for movement, upon trigger release, in a rectilinear path toward the tip of the bait supporting hook, the trigger control of the keeper being such that any contact with the assembly resulting in a slight pull on the hook relative to the leader line to which it is attached will release the keeper;

(3) A barbed fish hook, a resiliently biased trigger actuated mechanism adapted upon release of the trigger to forceably impale a fish on the bar, the trigger being movably connected to the remainder of the assembly and embodying a line attachment portion whereby any material pull upon the assembly against the line to which the trigger is attached will actuate the trigger to release such mechanism.

These and other objects of the present invention will become more fully apparent by reference to the appended claims and as the following detailed description proceeds with reference to the accompanying drawings wherein:

Figure 1 is a full-scale front elevational view of the fishing hook assembly of the present invention with the movable keeper or spear shown in its cocked position in solid lines and in its released position in phantom lines;

Figure 2 is a side elevational view of the structure shown in Figure 1;

Figure 3 is an enlarged sectional view taken substantially along the line 3—3 of Figure 1;

Figure 4 is an enlarged sectional view taken substantially along the line 4—4 of Figure 2;

Figure 5 is a front elevational view of one of the bow springs of the assembly of Figure 1 shown in its relaxed configuration; and Figure 6 is an side elevational view of a modified construction of the assembly of Figures 1 and 2 constituting a second embodiment of the present invention.

Referring now to the drawings, and particularly to Figures 1 and 2, the fishing hook assembly 10 of the present invention as here illustrated comprises a bait support 12, in the form of a fish hook with the line eye omitted and having a barb 14 at its hook tip, an elongated straight shank 16 terminating in a laterally projecting end portion 18; a keeper 20 in the form of a barbed spear or blade having a right angular leg 21 fixed to a tubular support 22 which is mounted in surrounding relation to shank 16 for longitudinal sliding movement along the shank 16 and biasing means 18 in the form of compression coil pivot means made up of a pair of opposed respectively outwardly bowed springs 24 pivoted at their opposite ends upon portion 19 of shank 16 and upon laterally extending extension 28 of support 22 adapted to resiliently bias the keeper toward the bait supporting hook 12.

Referring to Figure 5, it will be noted that each spring 24 in its relaxed condition is slightly bowed and embodies a centrally located tension coil 25 and identical end loops 26 and 26a. To assure accurate non-binding, non-deflecting axial projection of keeper 20, springs 24 are preferably held to minimum dimensional tolerances and are formed of equal length pieces of identically looped, bowed spring wire. In this way, an undesired deflection of hook 12 away from a nibbling or striking fish is avoided and interchangeability of springs is assured. This structure yieldingly stabilizes the keeper 20 against side-to-side movement to assure proper in line travel and to avoid bending or breaking of keeper 20 in use.

While keeper 20 is preferably in the form of a barbed spear and the biasing means 18 is in the form of a pair of bow springs, it is to be understood that it is within the intent of this invention that keepers and biasing means of other forms adapted to project the keeper toward hook 12 without binding canting on shank 16 may be substituted to effectively impale the fish on hook 12.

In the embodiment of Figures 1 and 2, support 22 is formed by a coil of wire wound loosely upon shank 16. This construction is preferred from the operational standpoint due to the axial flexibility of this form of support. The axial flexibility of support 22, when formed of a wire coil, permits it to move by conforming to the curvature of the lower end of shank 16 to a position lower on shank 16 than would be possible with a rigid tubular support and avoids possibility of cutting into the shank 16 at the end of its downward stroke as is possible with a rigid support due to its inertia.

As is best shown in Figure 4, the keeper 20 is connected to extension 28 of support 22 by a disc 29 into one face of which the right angularly extending leg portion 21 of keeper 20 is threaded and fixed by solder indicated at 23. The extension 28 of support 22 may be threaded into a hole in the opposite face of disc 29 in spaced parallel relation to portion 21 of keeper 20 but is also fixed thereto by the solder 23. Disc 29 also functions as a retainer to hold the lower end loops 26a of springs 24 on extension 28 as is clearly apparent from Figures 2 and 4.

A trigger mechanism indicated generally by the numeral 30 is provided to releasably maintain the keeper 20 in its upward or cocked position in opposition to the biasing force of springs 24. Trigger mechanism 30 comprises a lever 32 having an end loop 34 at one end to permit attachment of the assembly to a conventional leader line 35 through a conventional swivel 35a and a small loop portion 36 at the other end forming a universal pivot connection to a disc 38 to which the laterally extending portion 18 of the shank 16 is threadedly connected at 37 and soldered at 39 as is fully illustrated in Figure 3. Lever 32 carries a downwardly extending curved latch element 40 which cooperates with a second latch element 42 in the form of a loop extension of the coiled wire forming the support 22.

With the latch element 40 of the lever 32 engaged with the latch element 42 of the support 22, springs 24 are highly compressed and the keeper spear 20 is maintained in opposed spaced relation to the bait hook 12. The end of element 40 is preferably arcuate and formed about the pivot center of lever 32 relative to disc 38 as a center of curvature so that latch element 42 can be engaged with the latch loop of element 40 at its end and remain in that engaged position without creeping to a more positively latch condition. By this construction, the mechanism 30 may be set readily for hair-trigger action. When so set, a very slight pulling force, such as a fish nibbling the bait, applied to the hook 12 with the assembly 10 suspended from a leader line 35 in the water is effective to disengage latch elements 40 and 42 and release springs 24 to rapidly and forcibly drive the keeper spear 20 to its lower limit position illustrated in phantom lines in Figures 1 and 2 in which it is in overlapping off-set relation to the hook 12.

By this arrangement of keeper spear 20 relative to hook 12, any portion of a fish lying between the opposed keeper spear 20 and hook 12 at the time of actuation of the trigger mechanism will be impaled on both the keeper spear 20 and hook 12. The keeper spear 20 and hook 12 are off-set as illustrated so that they can overlap to achieve a tight grip on a fish without contacting each other and avoid dulling the sharp points thereof or of the associated barbs. The keeper spear 20 is located outwardly of the laterally off-set hook 12 with respect to the shank 16 and in line with the shank in the preferred construction so that even if the fish has withdrawn its mouth from the bait carried on the tip of hook 12 but is adjacent the hook 12, there is a very good probability that it will be impaled at least by the barbed spear 20 alone and thus caught. This overlapping off-set relation also permits baiting of hook 12 with the keeper 20 in its released position prior to cocking of the keeper under control of the latch mechanism 30. The possibility of injury to the user resulting from inadvertent release of the keeper spear 20 from its latched position during the baiting operation as is possible in certain prior art devices is thereby avoided.

Referring now to Figure 6, the embodiment of the invention therein illustrated comprises a barbed hook 50 having a shank 52 extending away from it and perfectly straight throughout its length. The end remote of hook 50 is received in a force fit within a shallow bore 54 of a header block 56 which is attached after slidably inserting the shank through a sliding support block 58 having a bore 60 through which the shank 52 extends for free relative sliding movement. A keeper spear 62, preferably suitably barbed as illustrated, is fixed to block 58 by the reception in a force fit of its laterally extending leg 64 within a shallow cross bore 66 provided adjacent one end of block 58. Block 58 is resiliently biased to its downward limit position as illustrated in Figure 6 along shank 52 by a pair of opposed bow springs 68 of identical construction with springs 24 in the first embodiment of the present invention.

Springs 68 are pivotally received upon the shank of a headed pin 72 the free shank end of which is fixed in the block 58 and their upper ends are pivotally received upon the shank of a headed pin 74 the free shank end of which is fixed in the block 56. The shanks of pins 72 and 74 are preferably press fitted into shallow cross bores 76 and 78 of blocks 58 and 56 respectively and are each preferably formed with conically shaped heads, the bases of which are coaxially related to the pin shanks over which the end loops 26 and 26a of the springs 68 may be pressed to expand them during the assembly operation. The maximum diameter of the heads of pins 72 and 74 is sufficiently greater than the normal diameter of the hole provided by loops 26 and 26a of the springs 68 so that after these loops are forced over the heads of the pins 72 and 74 the loops will, due to the resiliency of the material from which they are made, contract to their original diameter and freely encompass the shanks of those pins and be retained between the blocks 58 and 56 and the shoulder formed by the heads of the respective pins 72 and 74 to provide a permanent pivot assembly.

A trigger lever 80 adapted to be attached to a leader line in the same manner as the lever 32 of the first embodiment of this invention is universally connected to the block 56 by engaging a loop 82 at the lower end of lever 80 through a hole in a projecting ear 84 of block 56. Lever 80 is provided with a downwardly projecting curved latch element 86 of generally the same configuration as the latch element 40 of the embodiment of Figures 1 and 2. Latch element 86 is adapted to enter into and releasably engage a loop 88 formed in a cooperating wire latch element the opposite free end of which is received in a press fit within a shallow bore of the block 58. Latch elements 86 and 88 coact to form a trigger mechanism like that of Figures 1 and 2 which, when the block 58 is in its upper position, is effective to retain the keeper spear 62 in its upward or cocked position until release of the latch mechanism. The operation of this embodiment is substantially identical with that described with reference to the first embodiment.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In combination, a support, a fish hook at one end of said support, an impaling spear mounted on said support in laterally off-set opposed relation to said hook for movement between a first position adjacent to and in overlapping relation to said hook and a second position remote from said hook, resilient means biasing said spear toward said first position and comprising a pair of opposed bow springs pivoted at their opposite ends upon pivots respectively located on the end of said support remote from said hook and upon said spear and a trigger operable until released to retain said spear in said second position.

2. In combination with a straight cylindrical shank fishing hook, a keeper means freely slidably and encirclingly associated with said shank, resilient means fixed to said shank and connected to said keeper means through compression coil pivot means to yieldingly maintain said keeper means against lateral shifting movement and to provide an impelling force for moving said keeper means axially of said shank and trigger means for retaining said keeper means and said resilient means in cocked position with said resilient means being tensioned and operative when actuated by a fish pulling upon the bait of the baited fish hook to release said keeper means and said tensioned resilient means to thereby impel said keeper axially along said shank to impale the fish on said hook.

3. In combination, a pair of opposed barbed hooks, means mounting said hooks for relative translatory approaching movement, spring means fixed to the shank of one hook and mounting the other hook, said spring means being connected to said hooks through compressible coil loops and being operable to bias said hooks toward each other and to yieldingly maintain said mounted other hook against lateral shifting during said translatory movement, and a trigger mechanism operable to maintain said hooks in spaced translatory relation in opposition to said biasing force of said spring means until released.

4. In combination, a support comprising the shank of a fish hook joined at one end to a curved portion mounting a barbed hook having its barbed tip disposed to point toward said other end of said shank, said barbed tip being offset laterally out of the plane of said shank; an impaling spear mounted on said support in laterally off-set opposed relation to said barbed hook for movement between a first position in adjacent overlapping relation to said barbed hook and a second position remote from said barbed hook through a member fixed to said impaling spear and encircling said shank; means resiliently biasing said impaling spear toward said first position and connected to act on opposite sides of said impaling spear to yieldingly maintain said spear against lateral shifting during its movement toward said barb hook, said shank encircling member cooperating with said biasing means and said shank to retain said impaling spear during its movement directed substantially parallel to said shank and to determine a position of rest of said impaling spear in its first position when the forward end of said encircling member engages the curved hook portion adjacent the juncture of said one shank end and said curved portion of said hook; and a trigger operable until released to engage a portion of said encircling member and retain said impaling spear in said second position.

References Cited in the file of this patent
UNITED STATES PATENTS

| | | |
|---|---|---|
| 4,670 | Engelbrecht et al. | July 28, 1846 |
| 1,072,672 | Sweet | Sept. 9, 1913 |
| 1,604,031 | Ferguson | Oct. 19, 1926 |